United States Patent [19]

Sugimoto et al.

[11] Patent Number: 4,802,439
[45] Date of Patent: Feb. 7, 1989

[54] PRESSURE APPLYING MECHANISM FOR FIXING ROLLERS OF A COPYING APPARATUS

[75] Inventors: Yuji Sugimoto; Masaru Tsuji, both of Nara; Shoichiro Yoshiura, Yamatokoriyama, all of Japan

[73] Assignee: Sharp Kabushiki Kaisha, Osaka, Japan

[21] Appl. No.: 21,675

[22] Filed: Mar. 4, 1987

[30] Foreign Application Priority Data

Mar. 6, 1986 [JP] Japan .................................. 61-32991
May 16, 1986 [JP] Japan .................................. 61-112971

[51] Int. Cl.$^4$ ............................................. B05C 11/02
[52] U.S. Cl. ......................................... 118/116; 118/60; 355/3 FU; 100/171; 432/60
[58] Field of Search ............... 355/3 FU; 118/60, 249; 430/98, 99; 219/216; 432/60; 100/171; 68/257, 273

[56] References Cited

U.S. PATENT DOCUMENTS

| 612,099 | 10/1898 | Hagen et al. ................... 68/257 X |
| 2,638,768 | 5/1953 | Etten ........................... 68/257 |
| 3,132,581 | 5/1964 | Isbey et al. .................... 100/171 |
| 3,224,237 | 12/1965 | Brandt ......................... 68/257 |
| 3,874,894 | 4/1975 | Pedersen . |
| 4,087,926 | 5/1978 | Breslau et al. ............. 100/93 RP X |
| 4,428,660 | 1/1984 | Matsumoto .................... 355/3 FU |
| 4,696,561 | 9/1987 | Katoh et al. ................. 219/216 X |
| 4,716,435 | 12/1987 | Wilson ...................... 100/93 RP X |

FOREIGN PATENT DOCUMENTS

| 1772898 | 4/1975 | Fed. Rep. of Germany . |
| 2912506 | 10/1979 | Fed. Rep. of Germany . |
| 3536588 | 4/1986 | Fed. Rep. of Germany ... 355/3 FU |
| 3601133 | 7/1986 | Fed. Rep. of Germany ... 355/3 FU |
| 121366 | 7/1984 | Japan .............................. 355/3 FU |
| 49375 | 3/1985 | Japan .............................. 355/3 FU |

Primary Examiner—Shrive Beck
Assistant Examiner—Alain Bashore
Attorney, Agent, or Firm—Birch, Stewart, Kolasch & Birch

[57] ABSTRACT

A pressure device for applying pressure between an upper fixing roller and a lower fixing roller, the pressure applying device being disposed at each end of the lower fixing roller and including a bearing member for supporting a rotary shaft mounted in the lower fixing roller and a biasing spring for biasing the bearing member upwards. The upper and lower fixing rollers are held in pressure contact with each other through depression of the upper fixing roller towards the lower fixing roller, under the influence of the pressure device.

1 Claim, 3 Drawing Sheets

PRESSURE APPLYING MECHANISM FOR FIXING ROLLERS OF A COPYING APPARATUS

BACKGROUND OF THE INVENTION

The present invention generally relates to a pressure applying device for use in an image forming apparatus or the like and more particularly, to a pressure applying device for fixing rollers which are adapted to fix toner particles onto a record sheet through application of pressure to the toner particles in the image forming apparatus.

Toner particles or the like mainly composed of resin are generally employed as a developer material in an image forming apparatus. The toner particles are carried onto an eletrostatic latent image formed on the surface of a photosensitive member in the developing station of the image forming apparatus and are subsequently transferred onto a record sheet at the transfer station. Thereafter, the toner particles are fixed at a fixing station in the image forming apparatus with a pair of fixing rollers having been widely employed as the fixing devices, which rollers function to fix the toner particles onto the record sheet through the application of heat and pressure. In such a fixing device, a pressure applying device is provided in addition to the fixing rollers to bring the upper and lower rollers into appropriate pressure contact with each other. Conventionally, the pair of fixing rollers have been held in pressure contact with each other mechanically by a lever provided outside of the image forming apparatus. The pressure applying device of the above described type has, however, some disadvantages, such that the device has been necessarily complicated in construction and formed undesirably large in size.

SUMMARY OF THE INVENTION

Accordingly, the present invention has been developed with a view to substantially eliminating the above described disadvantages inherent in the prior art pressure applying devices, and has for its essential object to provide an improved pressure applying device which is simple in construction and is capable of holding a pair of upper and lower fixing rollers in pressure contact with each other.

Another important object of the present invention is to provide a pressure applying device of the above described type which is stable during functioning and can be readily manufactured at low cost.

In accomplishing these and other objects, according to preferred embodiments of the present invention, there is provided a pressure applying device for assisting in the application of pressure of an upper fixing roller and a lower fixing roller against each other, the pressure applying device being disposed at each end of the lower fixing roller and including a bearing means for supporting a rotary shaft mounted on the lower fixing roller and a biasing means for biasing the bearing means upwards, whereby the upper and lower fixing rollers are held in pressure contact with each other through depression of the upper fixing roller towards the lower fixing roller.

BRIEF DESCRIPTION OF THE DRAWINGS

These and other objects and features of the present invention will become apparent from the following description taken in conjunction with the preferred embodiments thereof with reference to the accompanying drawings, throughout which like parts are designated by like reference numerals, and in which.

DETAILED DESCRIPTION OF THE PREFERRED EMBODIMENT

Figure 1:
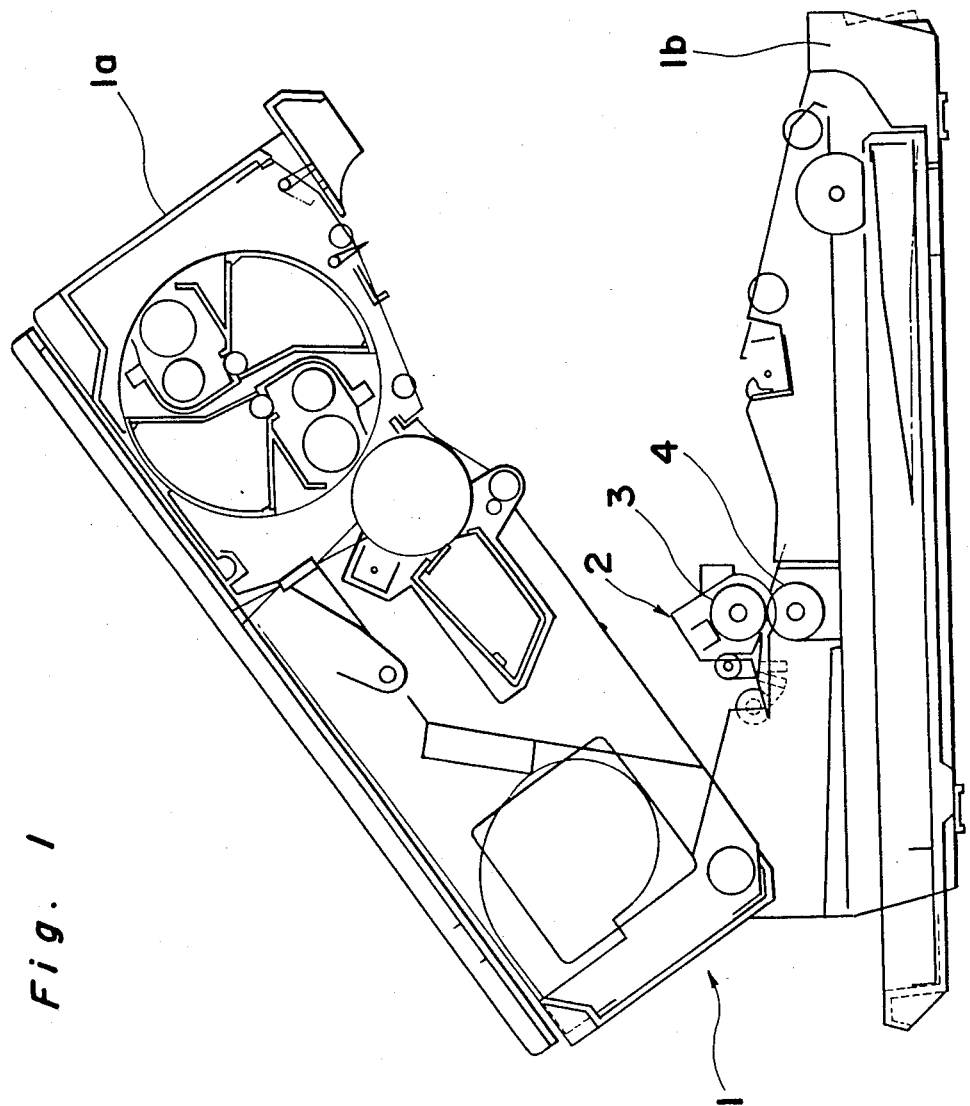
FIG. 1 is a schematic view of an image forming apparatus the clamshell type employing therein a pressure applying device for fixing rollers of the present invention.

Referring now to the drawings, there is shown in FIG. 1, an image forming apparatus 1 of the clamshell type employing therein a pressure applying device for fixing rollers of the present invention. In FIG. 1, the image forming apparatus 1 is provided with a set of an upper unit 1a and a lower unit 1b, with the upper unit 1a being connected in a hinged manner to the lower unit 1b at the left side thereof around an axis so as to be turned upward or openable with respect thereto. A fixing device 2 for fixing a toner image formed on a record sheet is disposed in the lower unit 1b of the image forming apparatus 1 and is composed of an upper fixing roller 3 and a lower fixing roller 4.

Figure 3:
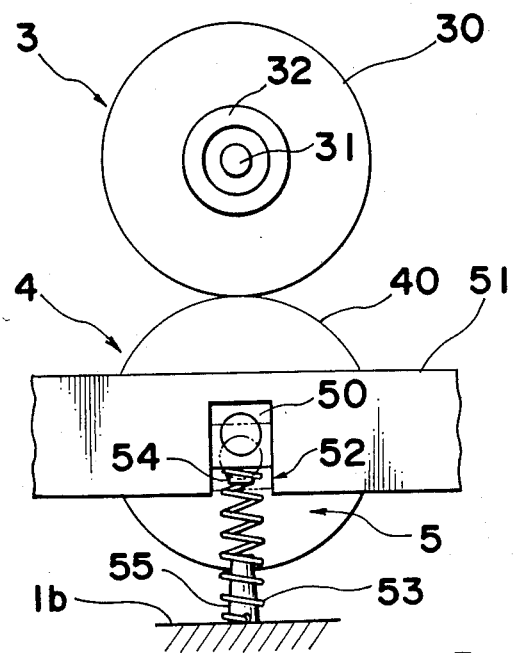
FIG. 3 is a front elevational view of FIG. 2.
Figure 2:
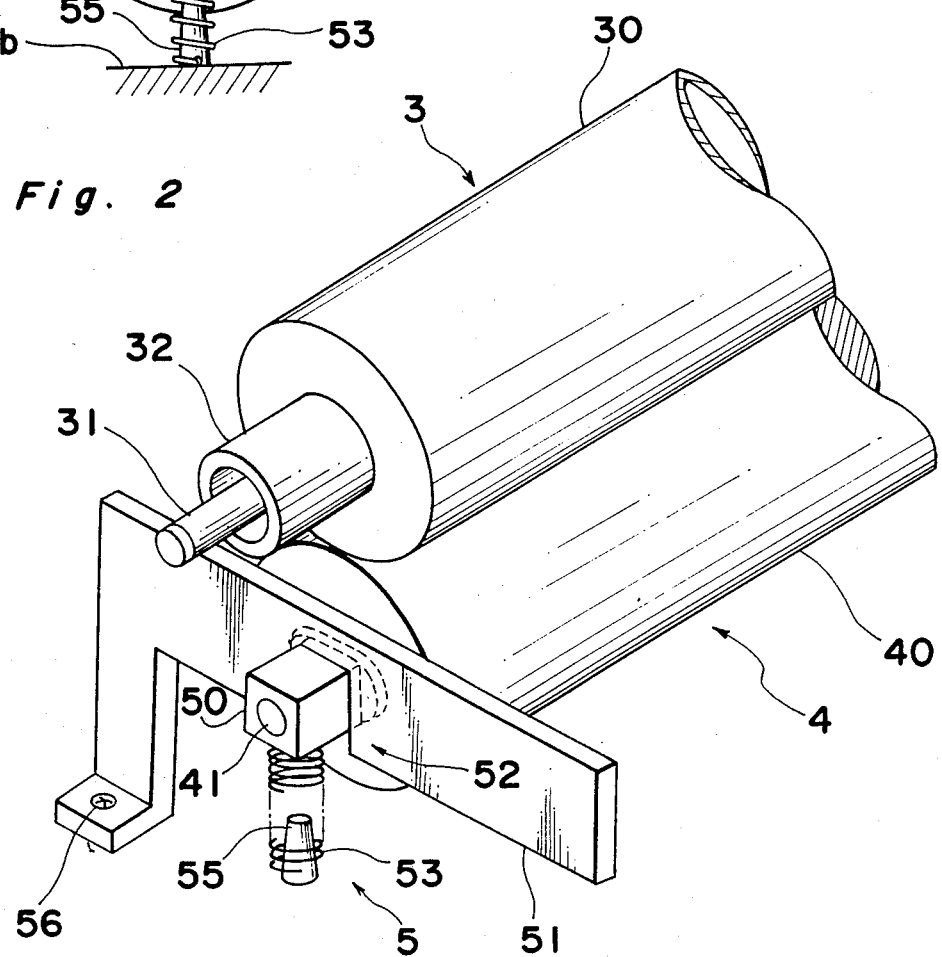
FIG. 2 is a fragmentary perspective view, on an enlarged scale, of the fixing rollers and the pressure applying device therefor according to a first embodiment of the present invention.

FIGS. 2 and 3 illustrate the pair of fixing rollers 3 and 4 and the pressure applying device 5 therefor according to a first embodiment of the present invention. The upper fixing roller 3 is provided with a hollow cylindrical roller body 30 accommodating a heater lamp 31, as shown in FIG. 2. The upper fixing roller body 30 has a rotary shaft 32 rotatably mounted on support portions (not shown) at opposite ends thereof, at least one end of which is coupled to a drive portion (not shown) so that the upper fixing roller body 30 is rotatably driven through transmission of a drive force from the driving portion. When the upper unit 1a of the image forming apparatus 1 is closed with respect to the lower unit 1b, the supported portions of the upper fixing roller 3 are depressed by the upper unit 1a so that the upper fixing roller 3 is brought into pressure contact with the lower fixing roller 4. The lower fixing roller 4 is composed of a cylindrical roller body 40 having an entire surface of silicone rubber or the like and a rotary shaft 41 formed on the roller body 40. The pressure applying device 5 for applying pressure to the upper and lower fixing rollers against each other is provided at each end of the lower fixing roller 4. The lower fixing roller 4 is rotatably mounted on a couple of bearing members 50 through the rotary shaft 41 thereof. A spring 53 is disposed under each bearing member 50 and is positioned by a projection 54 disposed at the bottom of the bearing member 50 and another projection 55 disposed on the lower unit 1b of the image forming apparatus 1. Furthermore, the bearing member 50 is positioned by an elongated supported plate 51 which is securely mounted by a screw 56 or the like on the lower unit 1b of the image forming apparatus 1. More specifically, a notch 52 substantially in the shape of a inverted "U" is defined in a lower portion of the support plate 51 and upon engagement of the bearing member 50 thereinto from below, the bearing member 50 is upwardly biased by the spring 53 so as to be positioned within the notch 52. A distance between the inner surface of the support plate 51 and the side surface of the lower fixing roller body 40 is extremely small. The notch 52 has a horizontal length substantially the same as that of the bearing member 50 and a vertical length slightly larger than that of the bearing member 50. By the construction as described so far, the upper fixing roller body 30 is brought into weak contact with the lower fixing roller body 40 by its own weight in the case where the upper unit 1a of the image forming apparatus 1 is opened with respect to the lower unit 1b thereof. When the upper unit 1a is closed, the lower fixing roller body 40 is depressed by the upper fixing roller body 30 and this fact produces a force by which the bearing member 50 is caused to move downwards, with the spring 53 being also caused to or contract shrink. The bearing member 50 is movable only in the vertical direction, since it is restricted within the notch 52 formed in the support plate 51. In the above described manner, the force produced by the fact that the upper fixing roller body 30 is pressed against the lower fixing roller body 40 is in opposition to another force produced by the spring 53 biasing the lower fixing roller body 40 upwards, thus resulting in the upper and lower fixing roller bodies 30 and 40 being brought into pressure contact with each other. In addition, since the spring 53 is positioned by the projections 54 and 55 respectively formed on the bearing member 50 and the lower unit 1b of the image forming apparatus 1, it will not move in the horizontal direction.

As described above, according to this embodiment of the present invention, the upper and lower fixing rollers 3 and 4 can be held in pressure contact with each other only by the provision of the bearing members 50 and the springs 53, and in addition, the lower fixing roller 4 can be prevented from moving in the horizontal direction by the support plates 51 and the projections 54 and 55 respectively formed on the bearing members 50 and the lower unit 1b of the image forming apparatus 1.

Figure 5:
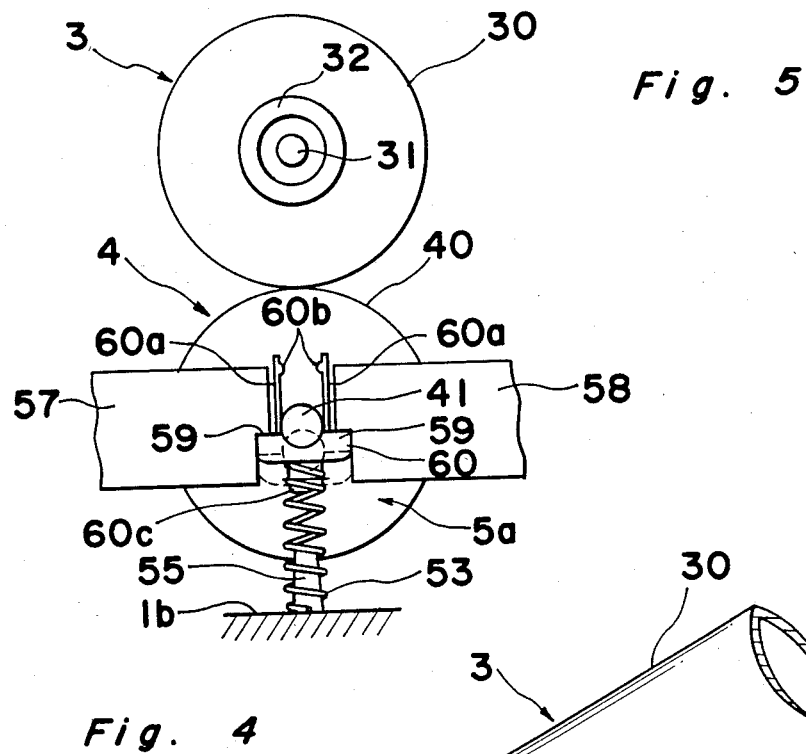
FIG. 5 is a front elevational view of FIG. 4.
Figure 4:
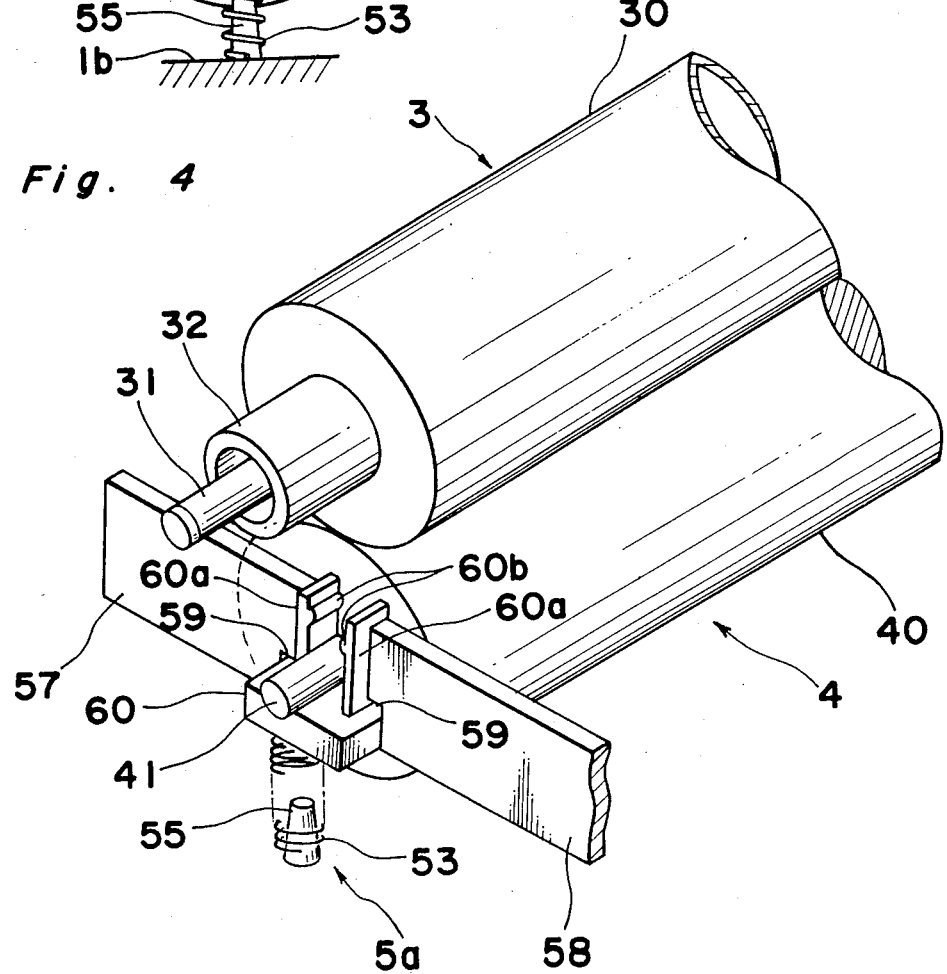
FIG. 4 is a view similar to FIG. 2, which particularly shows a second embodiment of the present invention.

There is shown in FIGS. 4 and 5, the pressure applying device 5a according to a second embodiment of the present invention, which is provided with a bearing member of a holding arm member 60 substantially in the form of "U", a spring 53 biasing the holding arm member 60 upwards, and a set of elongated support plates 57 and 58 adjacently disposed on respective sides of the holding arm member 60. Each of the support plates 57 and 58 is provided with a shoulder portion 59 substantially at the central portion of the two support plates 57 and 58 so that the holding arm member 60 is positioned between both of the shoulder portions 59 of the support plates 57 and 58. A spring 53 is disposed between a projection 60c formed at the bottom of the holding arm member 60 and a projection 55 formed on the lower unit 1b of the image forming apparatus 1. The holding arm member 60 has a couple of arm elements 60a each of which is provided with a protruding portion 60b formed on its inner wall, with both inner walls of the arm elements 60a facing each other. The general construction other than that above described is the same as that of the first embodiment of the present invention.

By the construction as described above, the holding arm member 60 is caused to move downwards in the same manner as in the aforementioned first embodiment, with the spring 53 being also caused to contract or shrink. In such a state, the upper and lower fixing rollers 3 and 4 are held in appropriate pressure contact wtih each other by an the effect of the spring 53. Meanwhile, when the upper unit 1a of the image forming apparatus 1 is not closed with respect to the lower unit 1b thereof, the holding arm member 60 is pushed upwards by the spring 53. At this moment, the holding arm member 60 moves upwards between the elongated support plates 57 and 58 adjacently disposed on respective sides thereof. However, since the shoulder portions 59 are formed substantially at the central portion between both support plates 57 and 58, the holding arm member 60 is positioned at a certain level by the shoulder portions 59. Accordingly, the spring 53 effects the holding arm member 60 so as not to be disengaged from the support plates 57 and 58 in any event. Furthermore, in the case where the lower fixing roller 4 is to be removed from the lower unit 1b of the image forming apparatus 1 by reason of routine inspection or the like, the lower fixing roller 4 can be readily removed therefrom only by taking off the upper fixing roller 3 in a state where the upper unit 1a of the image forming apparatus 1 is opened, since the holding arm member 60 is open at the upper portion thereof. Moreover, when the rotary shaft 41 of the lower fixing roller 4 is engaged into the holding arm member 60, the rotary shaft 41 is inserted thereinto through the opening portion defined at the upper portion thereof. In this event, although the protruding portions 60b formed on the arm elements 60a obstruct the insertion of the rotary shaft 41, the insertion can be readily and smoothly performed, since both of the arm elements 60a are spread out towards both sides. The protruding portions 60b function to prevent the rotary shaft 41 from being disengaged from the arm elements 60a.

As described above, the pressure applying device 5a according to this embodiment of the present invention is simple in construction and in the case where the lower fixing roller 4 is to be removed from the lower unit 1b by reason of the routine inspection or the like, it can be readily removed from the bearing members 5a only by lifting it up after the upper fixing roller 3 has been taken off from the lower unit 1b, since the rotary shaft 41 of the lower fixing roller 4 is supported on the bearing members, each of which is of the holding arm member 60 opened at the upper portion thereof substantially in the form of the figure "U". Furthermore, the lower fixing roller 4 can be readily set simply by placing it on the holding arm members 60 of the bearing members and the entire holding arm members 60 are caused to move downwards in the case where the upper fixing roller 3 together with the upper unit 1a is depressed towards the lower fixing roller 4. As a result, the pair of fixing rollers 3 and 4 can be held in pressure contact with each other by the springs 53 disposed under the holding arm members 60 and the lower fixing roller 4 can be advantageously readily mounted in or removed from the apparatus.

As clearly shown in the first and second embodiments described above, the pressure applying device of the present invention is remarkably simplified in construction, since it can be constructed only of a bearing member and the spring.

Although the present invention has been fully described by way of examples with reference to the accompanying drawings, it is to be noted here that various changes and modifications will be apparent to those skilled in the art. Therefore, unless such changes and modifications depart from the scope of the present invention, they should be construed as being included therein.

What is claimed is:

1. A pressure device for applying pressure between an upper fixing roller and a lower fixing roller of an image forming apparatus, said pressure device comprising:

a holding arm member for supporting a rotary shaft of said lower fixing roller at each end thereof, said holding arm member including a bearing portion and two vertical arm elements projecting from said bearing portion of said holding arm member such that said holding arm member substantially resembles a "U", each of said vertical arm elements having an inwardly protruding portion formed on an inner wall thereof, said inner walls of said arm elements facing each other such that said protruding portions prevent said rotary shaft of said lower fixing roller from being inadvertently detached from said holding arm member;

two horizontal stationary support plates located at each end of said lower fixing roller juxtapositioned to said rotary shaft adjacently disposed on respective sides of said vertical arm elements of said holding arm member, each support plate being provided with a shoulder portion substantially at the central portion thereof such that siad holding arm member is positioned between said support plates within said shoulder portions;

biasing means located immediately below said respective bearing portions of said holding arm members for biasing said holding arm members upward so that said respective holding arm members may be engaged with said respective shoulder portions of said support plates; and means for preventing said biasing means from moving in a horizontal direction, said pressure applying device being provided at each end of said lower fixing roller whereby said upper and lower fixing rollers are held in pressure contact with each other through depression of said upper fixing roller towards and with said lower fixing roller.

* * * * *